United States Patent [19]

Arumugasaamy et al.

[11] Patent Number: 5,817,982
[45] Date of Patent: Oct. 6, 1998

[54] NONLINEAR DIELECTRIC/GLASS INSULATED ELECTRICAL CABLE AND METHOD FOR MAKING

[75] Inventors: Panchadsaram Arumugasaamy, Granville; Thomas P. Hager, Westerville, both of Ohio

[73] Assignee: Owens-Corning Fiberglas Technology Inc., Summit, Ill.

[21] Appl. No.: 639,141

[22] Filed: Apr. 26, 1996

[51] Int. Cl.$^6$ ........................................ H01B 7/02
[52] U.S. Cl. ........................ 174/120 R; 174/120 C; 174/121 R; 174/124 G
[58] Field of Search ............... 174/120 R, 120 C, 174/122 G, 128.1, 122 R, 124 G, 121 R, 124 R; 385/107, 111, 113

[56] References Cited

U.S. PATENT DOCUMENTS

| | | | |
|---|---|---|---|
| 2,163,119 | 6/1939 | Freeland | 174/122 G |
| 2,186,442 | 1/1940 | Youmans | 174/102 R X |
| 3,339,012 | 8/1967 | Hutchins, Jr. | 174/128.1 |
| 3,425,865 | 2/1969 | Shelton, Jr. | 428/384 |
| 3,745,233 | 7/1973 | Lania et al. | 174/113 R |
| 3,773,546 | 11/1973 | Marzocchi | 523/345 |
| 3,773,607 | 11/1973 | Marzocchi | 523/203 |
| 3,837,897 | 9/1974 | Marzocchi | 523/345 |
| 3,864,203 | 2/1975 | Marzocchi | 523/203 |
| 3,900,701 | 8/1975 | Bayles et al. | 174/102 R |
| 3,903,354 | 9/1975 | Dageforde | 174/107 |
| 4,059,951 | 11/1977 | Roe | 57/149 X |
| 4,312,260 | 1/1982 | Morieras | 87/1 X |
| 4,345,112 | 8/1982 | Sugata et al. | 174/107 |
| 4,595,793 | 6/1986 | Arroyo et al. | 174/121 A |
| 4,761,520 | 8/1988 | Wade, Jr. et al. | 174/121 R |
| 4,810,834 | 3/1989 | Grögl et al. | 174/121 R |
| 4,906,308 | 3/1990 | Mudgett | 156/53 |
| 4,910,361 | 3/1990 | Mudgett | 174/121 R |
| 5,075,514 | 12/1991 | Hurd | 174/117 F |
| 5,131,064 | 7/1992 | Arroyo et al. | 385/102 |
| 5,133,034 | 7/1992 | Arroyo et al. | 385/107 |
| 5,160,783 | 11/1992 | Nemoto et al. | 428/261 X |
| 5,162,977 | 11/1992 | Paurus et al. | 361/401 X |
| 5,171,635 | 12/1992 | Randa | 428/383 |
| 5,227,586 | 7/1993 | Beauchamp | 174/122 R |
| 5,274,196 | 12/1993 | Weinberg | 174/121 R |
| 5,310,964 | 5/1994 | Roberts et al. | 174/121 A |
| 5,593,524 | 1/1997 | Philips | 156/51 X |

OTHER PUBLICATIONS

"Condensed Chemical Dictionary" 1981.
Ralph Strümpler, Jakob Rhyner, Felix Greuter, Petra Kluge–Weiss; "Nonlinear Dielectric Composites"; Feb. 28, 1995; Smart Structures and Materials.

*Primary Examiner*—Kristine L. Kincaid
*Assistant Examiner*—Chau N. Nguyen
*Attorney, Agent, or Firm*—C. Michael Gegenheimer; Inger H. Eckert

[57] ABSTRACT

A cable (100, 120) for transmitting electrical energy is constructed with a layer (104) of insulating and shielding material made up of pre-impregnated strands, for example glass strands (105), carrying a nonlinear dielectric material concentrically formed about an electrical conductor (102). A portion of the layer (104) is displaced by stranded material (116) pre-impregnated with a thermally conducting material to define a longitudinal heat distributing channel (114) along the cable (100, 120). The layer (104) of nonlinear dielectric material improves field control within the cable (100, 120) and also the temperature profile along the cable (100, 120), both of which improve performance and life expectancy. In addition, the electric field and the electromagnetic interference (EMI) around the cable (100, 120) are reduced. The longitudinal heat distributing channel (114) further improves the temperature profile along the cable (100, 120).

23 Claims, 3 Drawing Sheets

NONLINEAR DIELECTRIC/GLASS INSULATED ELECTRICAL CABLE AND METHOD FOR MAKING

TECHNICAL FIELD

The present invention relates in general to insulated cables for transmitting electrical energy and, more particularly, to cables using insulating and shielding material generally concentrically formed around a central conductor by means of stranded material, for example glass, pre-impregnated with a nonlinear dielectric material. The invention also relates to the manufacture of such cables.

BACKGROUND ART

A large variety of structures for insulated cables are known in the art. Typically, these cables include a central or core electrical conductor, such as copper, which can be either solid or stranded. One or more layers of material are then applied over the electrical conductor to form an insulated cable. It is a principle function of the one or more covering layers to electrically insulate the conductor. In addition, layers can also be provided to improve the heat resistance of the cable, to provide fire resistance and reduce associated smoking if the cable is burned or heated to high temperatures, to provide strength for the cable, to permit the cable to be easily stripped for utilization of the cable, to provide abrasion resistance and the like.

While a wide variety of materials have been used for cable covering layers, including glass and polymeric materials, recent investigations of so-called "smart materials" offer promise for further improvement of insulated cables. Smart materials are a class of materials which exhibit self-adaptive capabilities in response to external stimuli such that they appear to have inherent intelligence by adapting to the stimuli. Of particular interest to insulated cables are nonlinear dielectric materials which have changing dielectric constants in response to changes in temperature and/or electric field. During investigations of temperature sensitivity of such nonlinear dielectrics it has been suggested that nonlinear dielectric composites might considerably improve field control in high voltage applications. Unfortunately, no structures for such cables have been disclosed or suggested.

There is an ongoing need for improvements of insulated cables which extend both the operating characteristics and also the useful life of such cables. Preferably, new cable structures would improve field control within insulated cables and also the temperature profile along the cable both of which would improve performance and life expectancy.

DISCLOSURE OF INVENTION

This need is met by the method and apparatus of the present invention wherein a cable is constructed with a layer of insulating and shielding material comprising pre-impregnated strands, for example glass strands, carrying a suitable nonlinear dielectric material concentrically formed about an electrical conductor. A portion of the layer can be displaced by stranded material pre-impregnated with a thermally conducting material to define a longitudinal heat distributing channel along the cable. The layer of nonlinear dielectric material improves field control within insulated cables and also the temperature profile along the cable both of which improve performance and life expectancy. In addition, the electric field and the electromagnetic interference (EMI) around the cable are reduced. By including a longitudinal heat distributing channel along the cable, the temperature profile along the cable is further improved.

In accordance with one aspect of the present invention, a cable for transmission of electrical energy comprises an electrical conductor with a layer of insulating and shielding material formed generally concentrically therearound. The insulating and shielding layer comprises stranded material, for example glass, pre-impregnated with a nonlinear dielectric material. A continuous coating covers the layer of insulating and shielding material to protect the cable. The stranded material may comprise continuous rovings and the dielectric material may be selected from the group consisting of barium titanate, titanic acid esters, rutile, titanium oxides and mixtures including barium titanate.

The cable preferably further comprises an organic insulating layer selected from the group consisting of high density polyethylene, fluoropolymers and fluoroplastics formed between the electrical conductor and the layer of insulating and shielding material. The cable may further comprise a bonding layer of elastomeric polymer, for example neoprene, formed between the layer of insulating and shielding material and the continuous protective covering to hold the stranded material of the insulating and shielding layer to the cable.

For applications where grounding is desired, the cable may still further comprise an electrically conducting layer formed about the layer of insulating and shielding material. The electrically conducting layer can take the place of the bonding layer of elastomeric polymer or be used with the elastomeric polymer layer. For applications requiring a water-blocking barrier, the cable may further comprise a layer of water blocking material formed between the electrically conducing layer or the layer of elastomeric polymer and the continuous protective covering. The water blocking material may comprise stranded material, for example glass, pre-impregnated with superabsorbent powder.

The stranded material forming the layer of insulating and shielding material may be run generally parallel to the electrical conductor or may be wound around the electrical conductor at an angle relative to the axis of the electrical conductor. The winding angle can vary between approximately 0 and 60 relative to a longitudinal axis of the electrical conductor. The continuous protective coating may be selected from the group consisting of high density polyethylene, fluoropolymers, and fluoroplastics. To improve the temperature profile along the cable, a portion of the layer of insulating and shielding material may be displaced by stranded material, such as glass, pre-impregnated with a thermally conducting material to define a longitudinal heat distributing channel along the cable. The displaced portion may range from approximately 1% to 50% of the layer of insulating and shielding material.

In accordance with another aspect of the present invention, a method for forming a cable for transmission of electrical energy may comprise the steps of: providing an electrical conductor; concentrically applying around the electrical conductor a layer of insulating and shielding material formed of stranded material, for example glass, pre-impregnated with a nonlinear dielectric material; and, covering the layer of insulating and shielding material with a continuous protective coating.

The step of concentrically applying around the electrical conductor a layer of insulating and shielding material formed of stranded material pre-impregnated with a dielectric material may comprise the step of pre-impregnating the stranded material with a nonlinear dielectric material selected from the group consisting of barium titanate, titanic acid esters, rutile, titanium oxides and mixtures including barium titanate.

The method for forming a cable for transmission of electrical energy may further comprise the steps of: forming an organic insulating layer between the electrical conductor and the layer of insulating and shielding material; forming a bonding layer of elastomeric polymer between the layer of insulating and shielding material and the continuous protective covering; forming an electrically conducting layer about the layer of insulating and shielding material; forming a layer of water blocking material between the electrically conducting layer or bonding layer and the continuous protective covering; and, forming a portion of the layer of insulating and shielding material of stranded material pre-impregnated with a thermally conducting material to define a longitudinal heat distributing channel along the cable.

It is, thus, an object of the present invention to provide an improved electrical cable which is insulated, at least in part, by a layer of insulating and shielding material comprising pre-impregnated strands carrying a nonlinear dielectric material and a method of making the cable; and, to provide such a cable and method wherein a longitudinal heat distributing channel is formed along the cable within the layer of insulating and shielding material.

Other objects and advantages of the invention will be apparent from the following description, the accompanying drawings and the appended claims.

MODES FOR CARRYING OUT THE INVENTION

Figure 1:
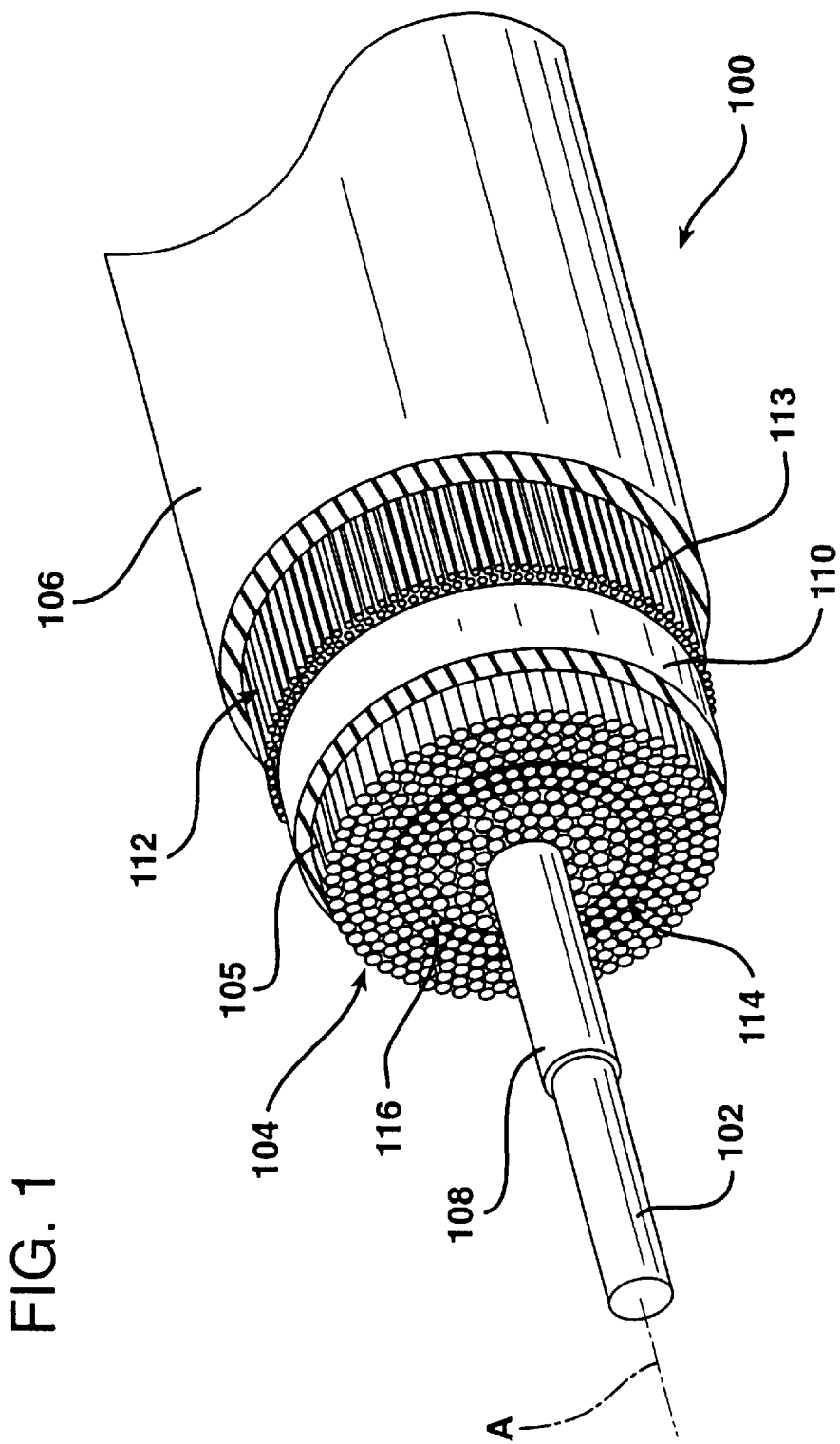
FIG. 1 is a perspective view of a first embodiment of a cable for transmitting electrical energy in accordance with the present invention with successive layers removed to show the structure.
Figure 2:
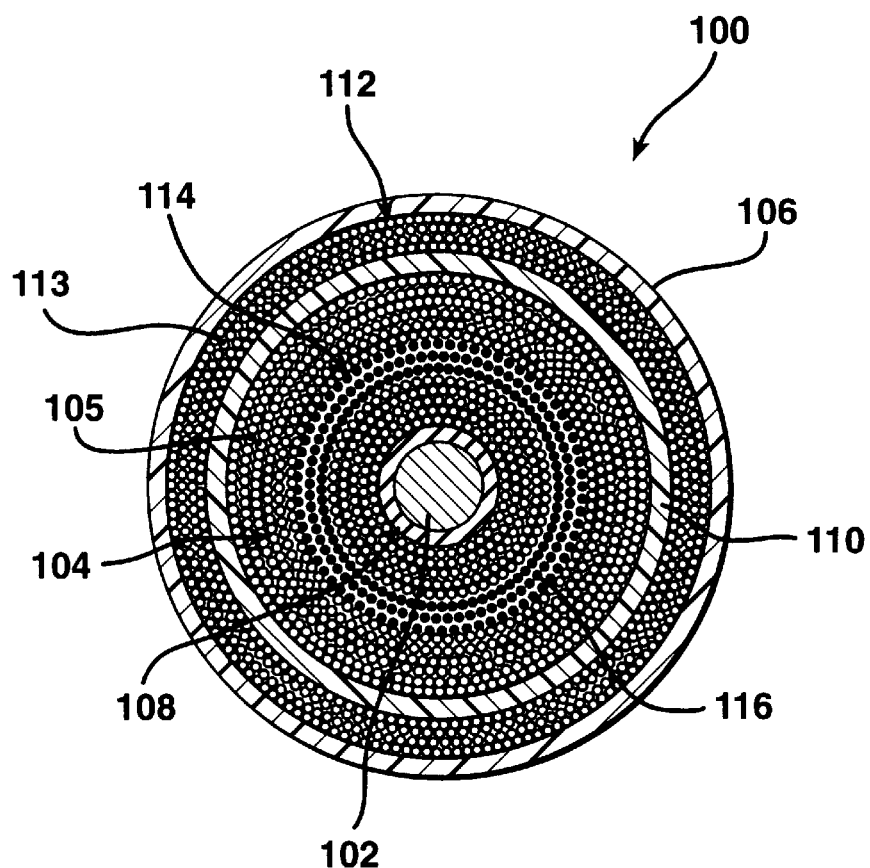
FIG. 2 is a sectional view of the cable of FIG. 1.

The present invention will now be described with reference to the drawings wherein FIGS. 1 and 2 illustrate a first embodiment of an insulated cable 100 for transmitting electrical energy. It is noted that the invention of the present application may be embodied in a variety of structures with the most basic structure including a central electrical conductor 102, a layer 104 of insulating and shielding material formed generally concentrically around the electrical conductor 102 by stranded material, for example glass strands 105 as illustrated, pre-impregnated with a nonlinear dielectric material, and a protective coating 106 covering the insulating and shielding layer 104 to form the outside of the cable.

While barium titanate and mixtures including barium titanate are currently preferred for the nonlinear dielectric material, other nonlinear dielectric materials can be used in the present invention including, for example, titanic acid esters, rutile and titanium oxides. The stranded material may comprise continuous strands, continuous rovings, continuous tape or the like which will be inclusively referred to herein as strands or stranded material. While the stranded material is illustrated as being run in parallel to the central electrical conductor 102, it can also be woven, stitched or any combination of parallel, woven and stitched, the various noted forms of stranded material being intermingled, layered to form a sandwiched structure or the like. It is currently preferred to use stranded glass material for the layer 104; however, other materials, both inorganic and organic, can be used in the present invention including, for example, textile fibers, polytetrafluoroethylene fibers, polypropylene fibers and aramid fibers. It is noted that some of these fibers are prone to melting at elevated temperatures such that their use is limited to low temperature applications.

In the first illustrated embodiment, the electrical conductor 102 is covered with a jacket or coating 108 made, for example, of high density polyethylene, suitable rubber based nonconducting materials, polytetrafluoroethylene or other fluoropolymers and fluoroplastics. The coating 108 enhances flexibility of the cable 100 and movement between the electrical conductor 102 and the layer 104 of insulating and shielding material.

The glass strands 105 ultimately used to form the layer 104 of insulating and shielding material are prepared by impregnation with suitable materials, such as thermoplastic or thermoset polymers, to protect the strands from self abrasion. The glass strands are then coated with organic or inorganic filler materials which display a nonlinear dielectric constant as a function of applied field strength and/or temperature.

The filler material increases the thickness of the glass strands and changes the dielectric properties of the glass strands to make them proportional to the dielectric properties of the filler materials. The thickness of the layer 104 varies dependent upon the cable being produced and is determined based on the power rating of the cable. In addition to insulation and shielding, the glass strands of the layer 104 contribute to the strength of the cable 100.

Figure 4:
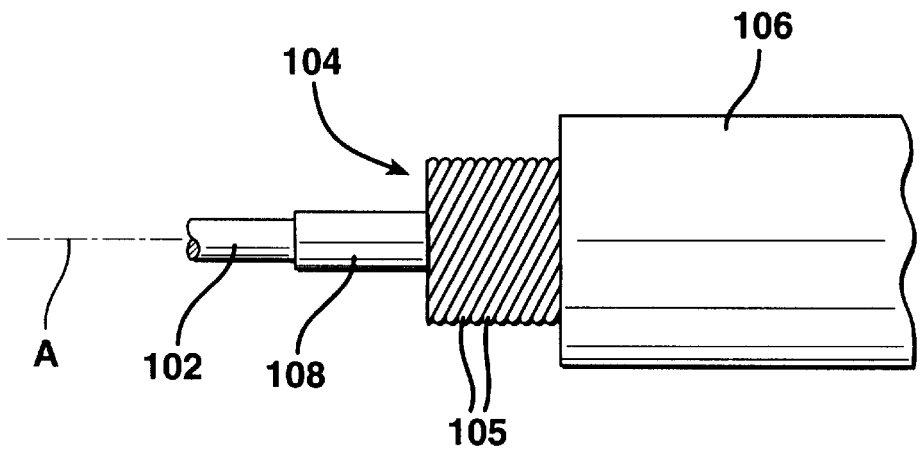
FIG. 4 is a side view of a cable for transmitting electrical energy illustrating stranded material wound at an angle relative to the axis of the cable of approximately 60°.

The glass strands 105, thus prepared, are formed generally concentrically around the electric conductor 102 upon the coating 108 to form the layer 104 of insulating and shielding material. The glass strands 105 can be formed onto the coating 108 of the electrical conductor 102 in a variety of ways including knitting, braiding, helical overwrapping and parallel placement. The required flexibility of the insulated cable 100 being formed can be influenced, to some extent, by the angle of the glass strands 105 relative to the longitudinal axis A of the cable 100. Preferably, the angle of the glass strands 105 relative to the longitudinal axis A is between 0° and 60°, see FIG. 4.

However applied, the glass strands 105 of the layer 104 are held in place within the cable 100 mechanically, chemically or through another binding mechanism. In the illustrated embodiment of FIGS. 1 and 2, the glass strands 105 of the layer 104 are held in place by a bonding layer shown as a jacket or coating 110 made of neoprene or another elastomeric polymer.

As earlier noted, the layer 104 of insulating and shielding material incorporated in the cable 100 displays a nonlinear dielectric constant as a function of applied field strength and/or temperature. By using the noted materials, the dielectric constant is a function of both applied field strength and temperature, both of which improve the performance of the cable 100. Improved performance is obtained since in areas where the electric field increases, the dielectric constant of the layer 104 also increases thereby reducing the dielectric stress in the layer 104 and homogenizing the field distribution. Also, an increase in the electric field is accompanied by an increase in temperature which further increases the dielectric constant thus further supplementing the improved performance of the insulated cable 100.

Insulated cables which offer a water-blocking barrier are often required, particularly for communications applications. While water-blocking greases can be injected into a cable to prevent water penetration, such greases create handling problems and so "dry cables" or cables which perform water-blocking without greases are preferred. To perform dry water blocking, water-swellable powders, such as sodium salts of polyacrylic polymers, are used to replace greases. While water-swellable powders can be used directly inside a cable, preferably strands of glass or other fibers are pre-impregnated with water-swellable powder and then incorporated into a cable to prevent water penetration into the cable.

Water blocking is provided in the insulated cable 100 by a layer 112 of water-blocking material formed between the coating 110 and the protective coating 106. In the illustrated embodiment of FIGS. 1 and 2, the layer 112 of water-blocking material is formed by stranded material 113, for example glass or aramid fibers marketed under the name Kevlar®[1], pre-impregnated with water-swellable powder. Such stranded material 113 is commercially available from a variety of sources.

[1] Kevlar is a trademark of E.I. DuPont de Neumours and Company, Inc.

In the first illustrated embodiment of the invention, a longitudinal heat distributing channel 114 is formed along the insulated cable 100 to further improve the performance of the cable 100. The channel 114, which is thermally conducting, distributes heat from higher temperature locations along the cable 100 to lower temperature locations thereby better dissipating heat produced within the cable 100.

Figure 3:
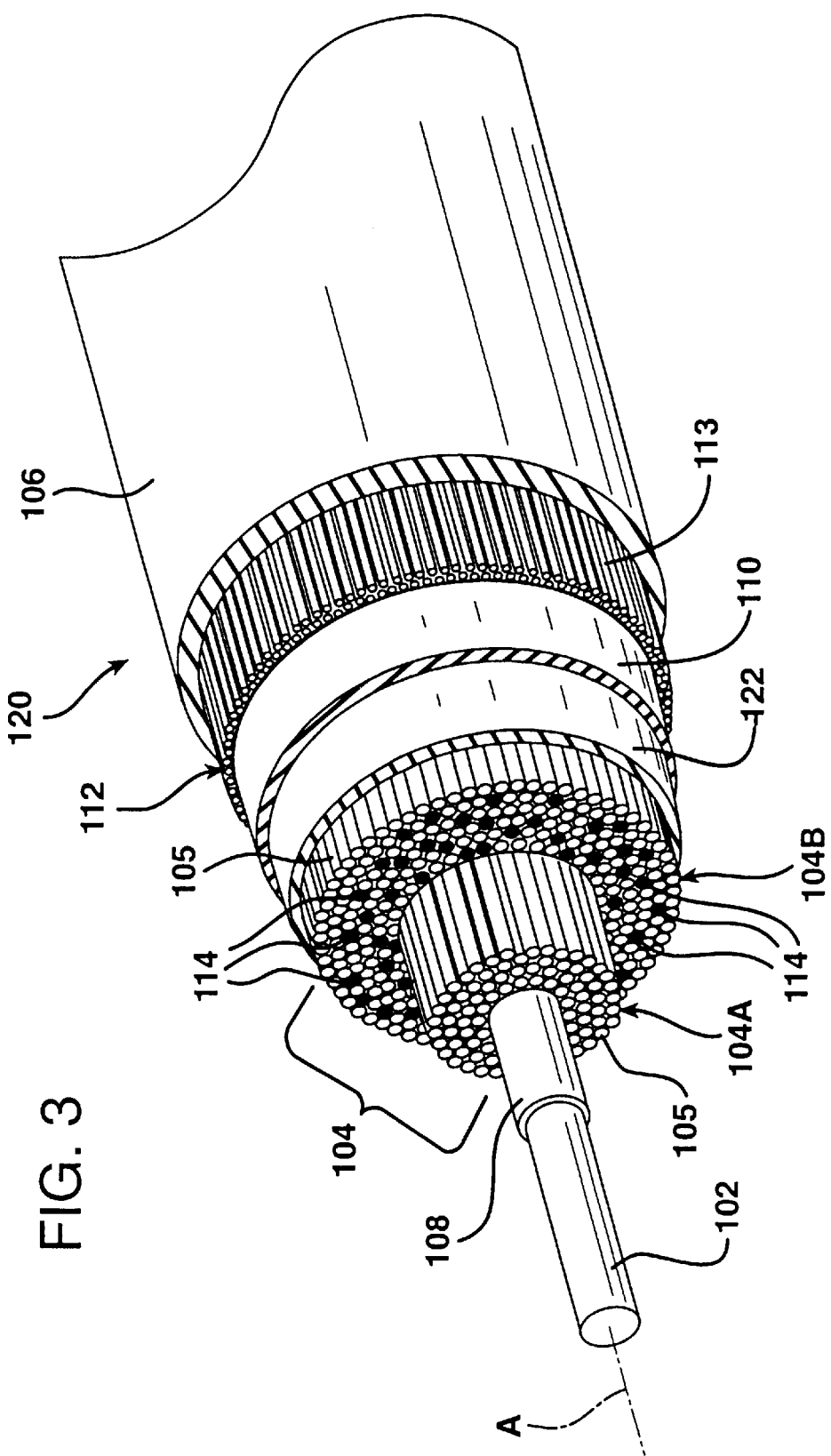
FIG. 3 is a perspective view of an alternate embodiment of a cable for transmitting electrical energy in accordance with the present invention with successive layers removed to show the structure.

As illustrated, the longitudinal heat distributing channel 114 is formed by displacing a portion of the layer 104 of insulating and shielding material with stranded material 116, such as glass, pre-impregnated with a thermally conducting material such as graphite, nickel or titanium. Preferably, the heat distributing channel 114 displaces between 1% and 50% of the layer 104 of insulating and shielding material. The heat distributing channel 114 is illustrated as being continuous and generally centered within the layer 104 of insulating and shielding material in FIGS. 1 and 2. However, the heat distributing channel 114 can be located anywhere between the coating 108 of the electrical conductor 102 and the coating 110, and can be discontinuous or randomly distributed throughout the layer 104 as is the case for the alternate embodiment of the cable 120 of FIG. 3 which will now be described.

Elements of the cable 120 which are the same as those of the cable 100 will be numbered the same as in FIGS. 1 and 2. To avoid repetition and needless lengthening of the description of the present invention, elements of the cables 100 and 120 which are the same will not be described with respect to the cable 120. The differences between the cable 120 and the cable 100 are the provision of an electrically conducting layer 122 which is formed about the layer 104 of insulating and shielding material and the formation of the layer 104 itself.

In particular, the electrically conducting layer 122 provides grounding for the cable 120 which grounding is generally required for high voltage cables, for example cables carrying 15 kilovolts or more. The grounding layer 122 can be formed by using copper tape, electrically conducting polymeric film, electrically conducting fibers or tapes which are knitted or otherwise formed about the layer 104. For cables operating at lower voltages, grounding typically is not required such that the first illustrated embodiment may be preferred as being less expensive.

Whether or not grounding, and hence the electrically conducting layer 122, is required depends upon the specific components of a cable and the operating voltage, and can be determined empirically through cable testing.

The layer 104 of insulating and shielding material is formed using components described above. In the alternate embodiment of FIG. 3, the layer 104 comprises an inner layer 104A of insulating and shielding materials as previously described without any heat distribution being intermingled therewith. An outer layer 104B is formed over the inner layer 104A to complete the layer 104. The outer layer 104B also comprises insulating and shielding material; however, intermixed therein is the heat distributing channel 114. As illustrated, the heat distributing channel 114 is randomly distributed throughout the outer layer 104B, but it can take other forms as previously described and as will be suggested to those skilled in the art from the disclosure of the present application.

Having thus described the invention of the present application in detail and by reference to preferred embodiments thereof, it will be apparent that modifications and variations are possible without departing from the scope of the invention defined in the appended claims.

We claim:

1. A cable for transmission of electrical energy comprising:
   an electrical conductor;
   a layer of insulating and shielding material formed generally concentrically around said electrical conductor by stranded material pre-impregnated with a nonlinear dielectric material, a portion of said layer of insulating and shielding material comprising stranded material pre-impregnated with a thermally conducting material to define a longitudinal heat distributing channel along said cable; and
   a continuous protective coating covering the layer of insulating and shielding material.

2. A cable for transmission of electrical energy as claimed in claim 1 wherein said stranded material comprises continuous rovings.

3. A cable for transmission of electrical energy as claimed in claim 1 wherein said stranded material comprises glass.

4. A cable for transmission of electrical energy as claimed in claim 1 wherein said dielectric material is selected from the group consisting of barium titanate, titanic acid esters, rutile, titanium oxides and mixtures including barium titanate.

5. A cable for transmission of electrical energy as claimed in claim 1 further comprising an organic insulating layer formed between said electrical conductor and said layer of insulating and shielding material.

6. A cable for transmission of electrical energy as claimed in claim 5 wherein said organic insulating layer is selected from the group consisting of high density polyethylene, fluoropolymers and fluoroplastics.

7. A cable for transmission of electrical energy as claimed in claim 5 further comprising an electrical conducting layer formed between said layer of insulating and shielding material and said continuous protective coating.

8. A cable for transmission of electrical energy as claimed in claim 5 further comprising a bonding layer of elastomeric polymer formed between said layer of insulating and shielding material and said continuous protective coating.

9. A cable for transmission of electrical energy as claimed in claim 8 wherein said bonding layer is formed of neoprene.

10. A cable for transmission of electrical energy as claimed in claim 9 wherein said bonding layer further comprises an electrical conducting layer formed about said layer of insulating and shielding material.

11. A cable for transmission of electrical energy as claimed in claim 8 further comprising a layer of water blocking material formed between said layer of elastomeric polymer and said continuous protective coating.

12. A cable for transmission of electrical energy as claimed in claim 11 wherein said layer of water blocking material comprises stranded material pre-impregnated with superabsorbent powder.

13. A cable for transmission of electrical energy as claimed in claim 1 wherein said stranded material is run generally parallel to said electrical conductor.

14. A cable for transmission of electrical energy as claimed in claim 1 wherein said stranded material is wound around said electrical conductor at an angle varying between approximately 0° and 60° relative to a longitudinal axis of said electrical conductor.

15. A cable for transmission of electrical energy as claimed in claim 1 wherein said continuous protective coating is selected from the group consisting of high density polyethylene, fluoropolymers and fluoroplastics.

16. A cable for transmission of electrical energy as claimed in claim 1 wherein said portion comprises between approximately 1% and 50% of said layer of insulating and shielding material.

17. A method for forming a cable for transmission of electrical energy comprising the steps of:

providing an electrical conductor;

concentrically applying around said electrical conductor a layer of insulating and shielding material formed of stranded material pre-impregnated with a nonlinear dielectric material;

forming portion of said layer of insulating and shielding material of stranded material pre-impregnated with a thermally conducting material to define a longitudinal heat distributing channel along said cable: and covering said layer of insulating and shielding material with a continuous protective coating.

18. A method for forming a cable for transmission of electrical energy as claimed in claim 17 wherein said step of concentrically applying around said electrical conductor a layer of insulating and shielding material formed of stranded material pre-impregnated with a dielectric material comprises the step of pre-impregnating said stranded material with a nonlinear dielectric material selected from the group consisting of barium titanate, titanic acid esters, rutile, titanium oxides and mixtures including barium titanate.

19. A method for forming a cable for transmission of electrical energy as claimed in claim 18 further comprising the step of forming an organic insulating layer between said electrical conductor and said layer of insulating and shielding material.

20. A method for forming a cable for transmission of electrical energy as claimed in claim 19 further comprising the step of forming an electrically conducting layer between said layer of insulating and shielding material and said continuous protective coating.

21. A method for forming a cable for transmission of electrical energy as claimed in claim 20 further comprising the step of forming a layer of water blocking material between said electrically conducting layer and said continuous protective coating.

22. A method for forming a cable for transmission of electrical energy as claimed in claim 19 further comprising the step of forming a bonding layer of elastomeric polymer between said layer of insulating and shielding material and said continuous protective coating.

23. A method for forming a cable for transmission of electrical energy as claimed in claim 22 further comprising the step of forming a layer of water blocking material between said bonding layer and said continuous protective coating.

* * * * *